United States Patent
Lounsberry (10) Patent No.: US 8,355,344 B1
(45) Date of Patent: Jan. 15, 2013

(54) STORAGE AREA NETWORK EDGE-CORE INTERSWITCH LINK OPTIMIZATION

(75) Inventor: David Bruce Lounsberry, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 633 days.

(21) Appl. No.: 12/178,605

(22) Filed: Jul. 23, 2008

(51) Int. Cl.
*H04L 12/28* (2006.01)

(52) U.S. Cl. ......... 370/254; 370/351; 709/229; 709/238

(58) Field of Classification Search .................. 370/254, 370/401, 402, 464, 468
See application file for complete search history.

(56) References Cited

U.S. PATENT DOCUMENTS

| | | | | |
|---|---|---|---|---|
| 6,542,468 | B1* | 4/2003 | Hatakeyama | 370/238 |
| 6,965,593 | B2* | 11/2005 | Donahue et al. | 370/352 |
| 7,177,270 | B2* | 2/2007 | Sim et al. | 370/229 |
| 7,353,294 | B1* | 4/2008 | Nucci et al. | 709/241 |
| 7,633,949 | B2* | 12/2009 | Zadikian et al. | 370/396 |
| 7,643,468 | B1* | 1/2010 | Arregoces et al. | 370/351 |
| 7,765,321 | B2* | 7/2010 | Twata et al. | 709/238 |

\* cited by examiner

*Primary Examiner* — Robert Wilson
*Assistant Examiner* — Brian O Connor (57) ABSTRACT

Systems and methods for configuring a network are disclosed that comprise creating a list of functional elements of the network, determining the operational requirements of the functional elements, and determining an acceptable over subscription rate of the functional elements. These systems and methods may also comprise creating a list of interconnecting switches required to connect the functional elements, configuring the interconnecting elements, creating a list of core elements required to connect the interconnecting elements, and configuring the core elements.

19 Claims, 6 Drawing Sheets

STORAGE AREA NETWORK EDGE-CORE INTERSWITCH LINK OPTIMIZATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A computer network may comprise functional and interconnecting switches. Functional elements include elements that provide a service or storage. Examples of functional elements include servers and disk arrays. Interconnecting switches are those elements that promote communication between functional elements. Examples of interconnecting switches include network switches.

Computer networks require that sufficient interconnecting switches be present to allow the functional elements to communicate efficiently. The design and configuration of the interconnecting switches needs to be done in such a way so as to promote the efficient communication of the functional elements without wasting resources.

SUMMARY

In one embodiment, a method configuring a network is disclosed that comprises creating a list of functional elements of the network, determining the operational requirements of the functional elements, and determining an acceptable oversubscription rate of the functional elements. This method also may comprise creating a list of interconnecting switches required to connect the functional elements, configuring the interconnecting elements, creating a list of core elements required to connect the interconnecting elements, and configuring the core elements.

Another disclosed method for configuring a network comprises determining the operational requirements for a plurality of interconnecting elements, configuring the interconnecting element, determining the operational requirements for a plurality of core elements used to connect the interconnecting elements, and configuring the core elements. This method may further comprise determining the operational requirements for a plurality of functional elements to be connected to the interconnecting elements and creating a network configuration for the functional elements, the core elements, and the interconnecting elements.

In yet another embodiment, a system for configuring a network is disclosed that comprises a memory component to store network information related to a data network, wherein the data network comprises at least one core switch, at least one interconnecting switch, and at least one functional element. This system also may comprise an interface to accept input, wherein the input comprises at least one oversubscription rate, a processor component to use the network information, and the at least one oversubscription rate to create a network schematic. In this embodiment, the processor component executes instructions to determine the capabilities of each port on each of the at least one core switch, at least one interconnecting switch, and at least one functional element, and creates a schematic that reconfigures the connections between the at least one core switch, at least one interconnecting switch, and at least one functional element by connecting ports to other ports of substantially equal bandwidth. In addition, this system may further comprise an output component to output a schematic of a network configuration.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one embodiment of the present disclosure is illustrated below, the present system may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

Companies may require large data centers that can accept, process, store, and retrieve large amounts of data. In order to accept, process, store and retrieve large amounts of data, these data centers may comprise different classes of components such as functional elements, interconnecting switches, and core switches. The data center may contain a plurality of discrete elements within each one of these classes of components, and each of these discrete elements may to be configured in such a way to allow for the efficient acceptance, processing, storage, and retrieval of data throughout the data center. One of the problems in configuring the data center lies in how to configure the discrete elements in such a way to promote efficient communication between the plurality of discrete elements and group elements, for example to avoid bottlenecks. Several variables exist in the configuration of the data center that need to be addressed including, but not limited to, the amount of data being accepted, processed, stored, and retrieved, the number of discrete elements, the configuration of the discrete elements, and the capabilities of the discrete elements. One approach disclosed herein provides systems and methods that allow for the discrete elements of the data center to be analyzed in such a manner to allow for the capabilities and requirements of each discrete element to be determined. Through determining the capabilities and requirements of the discrete elements within the data center, the requirements of the interconnecting switches may be determined. Using the requirements of the interconnecting switches, the configuration of the discrete elements of the data center and a schematic for the design of the data center may be determined.

For the purpose of clarity, and without limiting the scope of the disclosure, a number of terms and phrases will be clarified. The phrase "functional elements" may refer to any element which provides data storage, data manipulation, or any other data function. Examples of the phrase "functional element" include, but are not limited to, servers, disk storage, legacy storage, other storage, and backup units. Multiple functional elements may be combined into a single combined functional element. One example of this single combined functional element is a Redundant Arrays of Inexpensive Disks (RAID) array.

The phrase "interconnecting switches" may refer to any element that provides connectivity, communication path, couples, or connects at least one functional unit with at least one core switch. Examples of "interconnecting switches" include, but are not limited to, server switches, legacy switches, disk switches, other switches, hubs, routers, or other network equipment. The interconnecting switches may, in some embodiments, be configured to allow for different connection types, connection speeds, and numbers of connections between one or more functional units and one or more core switches.

The phrase "core switches" may refer to any element that provides connectivity, communication path, couples, or connects at least two interconnecting switches. It is understood that the phrase "core switch" may, in some embodiments, be used in place of the phrase "core switches". Core switches, in some cases, may be implemented as network bridges to functionality that connect a plurality of interconnecting switches. For example, the core switches may bridge from switches that face application servers to other switches that face data storage, for example in a large computer system promoting high speed access to large volumes of data, to promote access of the application servers to the data storage.

Figure 1:
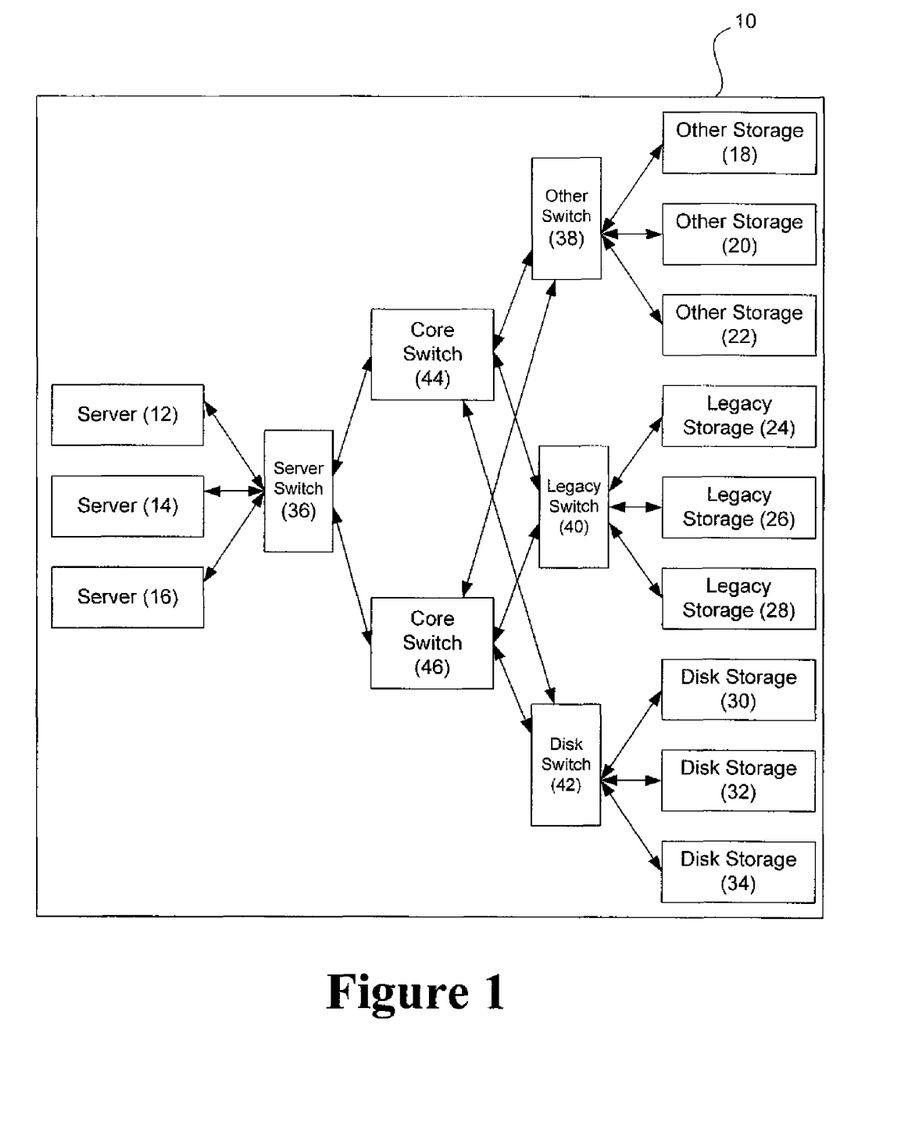
FIG. 1 is an illustration of an exemplary computer network according to an embodiment of the disclosure.

FIG. 1 illustrates a data center 10 that may be used in combination with the present disclosure. In the example shown in FIG. 1, a plurality of functional elements, interconnecting switches, and core switches are shown. In FIG. 1, functional elements include a plurality of servers, other storages, legacy storages, and disk storages. The interconnecting switches shown in FIG. 1 comprise a server switch 36, an other switch 38, a legacy switch 40, and a disk switch 42. The core switches shown in FIG. 1 comprise a first core switch 44 and a second core switch 46. In this example, a first server 12, a second server 14, and a third server 16 are in communication with the server switch 36. A first other storage 18, a second other storage 20, and a third other storage 22 are in communication with the other storage switch 38. A first legacy storage 24, a second legacy storage 26, and a third legacy storage 28 are in communication with the legacy switch 40. A first disk storage 30, a second disk storage 32, and a third disk storage 34 are in communication with the disk switch 42. The disk switch 42, the legacy switch 40, the other switch 38, and the server switch 36 are in communication with a first core switch 44 and a second core switch 46.

The first server 12, the second server 14, and the third server 16 may be any combination of servers designed to promote the execution of any function, including, but not limited to the execution of applications designed to access information from one or more discrete elements, data sources, or sources outside of the data center 10. In these embodiments, the server 12, 14, 16 may execute one or a plurality of applications which, in some embodiments, may require data that is routed through the network. It is expressly further understood that servers 12, 14, and 16 may route traffic over an alternate network, such as a local intranet or internet.

The first other storage 18, the second other storage 20, and the third other storage 22 may be any device capable of storing, retrieving, accessing, or otherwise manipulating data, or may be a combination of disk storage, legacy storage, or other storage. Examples of other storage include, but are not limited to, magnetic tape. It is explicitly understood that other storage is inclusive of any media, device, system, or method of storing, retrieving, accessing, or otherwise manipulating data not covered within disk storage, legacy storage, or servers. The operational requirements of the other switch 38 are based upon the operational requirements of the first other storage 18, the second other storage 20, and the third other storage 22.

The phrase "operational requirements" is intended to refer to the latency, bandwidth, throughput, or other network requirements of any switch or any functional element. This operational requirement may be based upon known requirements (e.g. for streaming video or heavy transactional workload there may be an operational requirement for a very low latency) or a desired requirement (e.g., for a server there may be a desire for access to a large bandwidth).

The first legacy storage 24, the second legacy storage 26, and the third legacy storage 28 may be any type of storage device that are from a previous generation of network which have been integrated into the network. Legacy devices may comprise a plurality of similar or dissimilar devices including, but not limited to, legacy disk storage, legacy servers, or other devices which are from a previous generation of network equipment. Legacy storage devices communicate with the legacy switch 40. The operational requirements of the legacy switch 40 are based upon the requirements of the first legacy storage 24, the second legacy storage 26, and the third legacy storage 28.

The first disk storage 30, the second disk storage 32, and the third disk storage 34 may be any type of single or plurality of disks configured in any way known to one skilled in the art. Examples of disk storage include, but are not limited to, discrete devices such as hard disk drive (HDD), solid state drive (SSD) as well as groups of discrete devices such as storage area networks (SAN), network attached storage (NAS), Redundant Arrays of Independent Disk (RAID), other types of drives, or any combination thereof. A drive is a generic term that is directed towards a device whose purpose includes the storing and retrieving of data requested by another system. It is understood that a plurality of discrete devices may make up a single discrete element, such as in a RAID. The operational requirements of the disk switch 42, in some embodiments, may be based upon the requirements of the first disk storage 30, the second disk storage 32, and the third disk storage 34 or the first core switch 44 and the second core switch 46.

The other switch 38, the legacy switch 40, the disk switch 42, and the server switch 36 are in communication with the core switches 44, 46. Two separate core switches are illustrated to provide redundancy. While not illustrated in FIG. 1, in some embodiments the switches 36, 38, 40, and 42 also may be associated with redundant switches. It is expressly understood that a plurality of other switches 38, legacy switches 40, disk switches 42, and server switches 36 may be used consistent with the present disclosure. The core switches 44, 46 provide communications between each of the different components of the data center 10.

In order to permit redundancy desired by some data centers, the network configuration may allow for a plurality of connections between one or more switches or functional elements. In FIG. 1, this redundancy is highlighted by the illustration of the first core switch 44 and the second core switch 46. Should one of these core switches fail, redundancy exists to promote communication throughout the data network. It is explicitly understood that this same redundancy also may be present (although not illustrated in FIG. 1) in any of the interconnecting switches.

The redundancy illustrated by FIG. 1 allows for continued operation even if the first core switch 44 or the second core switch 46 fails. In order to allow for this configuration, sufficient capacity needs to be present within both the first core switch 44 and the second core switch 46 to allow for communication between the various functional elements. This capacity, or bandwidth requirement, may be taken into consideration when designing the data center 10.

One approach to configuring the devices shown in FIG. 1 is to first determine the operational requirements of the functional elements. Using these requirements, the maximum requirements for the corresponding interconnecting switches may be determined. For exemplary purposes only, and using the functional elements the first server 12, the second server 14, and the third server 16, if the maximum requirement of the first server 12 is for 2 Gbit/s, the maximum requirement for the second server 14 is for 4 Gbit/s, and the maximum requirement for the third server 16 is 6 Gbit/s, the sum of the maximum equipments might be 12 Gbit/s. This 12 Gbit/s is a theoretical maximum number that represents the total bandwidth that could be requested at any given time.

Using the total amount of bandwidth that could be requested at a given time, an acceptable bandwidth may be determined. The phase "acceptable bandwidth" is generally referred to as the amount of bandwidth that needs to be available at any given time. The "acceptable bandwidth" is generally lower than the total requested bandwidth because the probability that the total amount of requested bandwidth will be simultaneously requested by the first server 12, the second server 14, and the third server 16 will equal the theoretical maximum may be low. Given that it would therefore be inefficient to provide unnecessary bandwidth, an oversubscription rate is chosen which will create a modifier of the total bandwidth that could be requested at any given time to create the actual bandwidth that will be available at a given time.

Oversubscription may occur as either network oversubscription or device oversubscription. Network oversubscription refers to the rate at which network bandwidth provided is less than what may be requested within a network as measured between devices. An example of network oversubscription, using the example above, is if the server switch 36 could only support a total load of 8 Gbit/s, there would be an oversubscription of (12/8) or about 1.5. Device oversubscription refers to the amount of bandwidth that a device may provide through the device. For instance, if an interconnecting device advertises that it can provide connectivity through 10 ports, each of which provides a 4 Gbit/s capacity, the theoretical capacity of the device might be 40 Gbit/s. However, if the interconnecting device can only actually permit communication at the rate of 20 Gbit/s, there would be a device oversubscription rate of (40/20) or 2. When designing a data center 10, both device oversubscription rates and network oversubscription rates may be taken into consideration.

In an embodiment, device oversubscription rates may range from about 2 to about 5. In an embodiment, network oversubscription rates may range from about 3 to about 8. Because the end-to-end or device-to-inter switch link oversubscription rate, in a worst case, may be the product of the device oversubscription rate with the network oversubscription rate, the device oversubscription rate and the network oversubscription rate should be selected to result in product that is acceptable as a worst case end-to-end oversubscription rate. In an embodiment, the end-to-end oversubscription rate may range from about 10 to about 20. The choice of an appropriate device and network oversubscription rate may be made based upon network considerations including, but not limited to, the anticipated discrete element usage, the network conditions, or any other factor known to one skilled in the art when using this disclosure as a reference. It is understood that the oversubscription rate may be selected by a user through a terminal connection, a graphical user interface, or any other method known to one skilled in the art when used in combination with this disclosure.

This acceptable bandwidth is the bandwidth that the interconnecting element (e.g., server switch 36) may be required to be capable of transmitting and receiving. The process of determining the amount of bandwidth required for each interconnecting may be determined in a similar way to how the bandwidth requirement of the server switch 36 is determined. In some embodiments, all functional elements that the interconnecting element is connected to are identified, the bandwidth requirements are identified, an oversubscription rate is identified, and the requirements of the functional elements are determined.

It is understood that the requirements of each group of functional elements may be dissimilar and therefore the requirements of the interconnecting switches may be dissimilar.

Other requirements, such as latency requirements and throughput requirements, may be subsumed in the operational requirements. Latency requirements, for example, deal with how responsive hardware needs to be to requests that are made. One example of a very low latency type of application is where a server requests information from a disk in a small part, wherein the information is needed for the server immediately. Since the server may have to wait for a response to the request for data, the server may need a low latency so that the response will be quickly sent to the application server. In contrast, a backup system may not be concerned with a low latency and may be only concerned with a high data throughput. Throughput is concerned with how much data is being pushed through a connection during a given time, either in burst transfer or sustained transfer. Throughput, in some embodiments, may be referred to as the bandwidth. When designing a data network, the throughput, latency, and bandwidth requirements of each functional element, interconnecting element and core element need to be determined.

Once the requirement of the interconnecting switches has been determined, the requirements of the core switches may be determined. By using the same method disclosed above of determining the requirements for the interconnecting switches from the functional elements, the requirements of the core switches may be determined from the interconnecting switches. After the requirements for the core switches have been determined the network may be designed. The design of the network will use the requirements for network bandwidth in order to determine the physical configuration of the Inter-Switch Link (ISL) devices.

Figure 2:
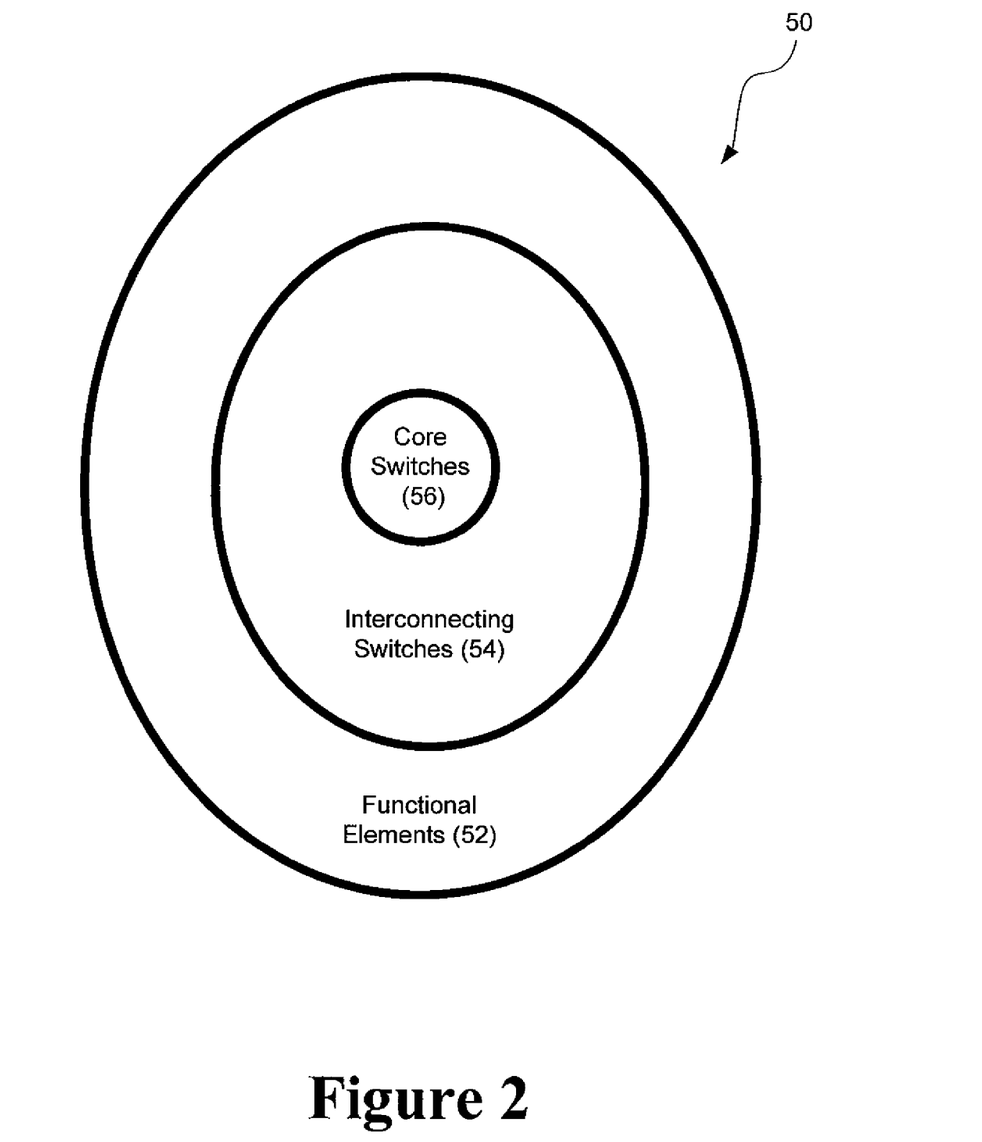
FIG. 2 is an illustration of another exemplary computer network according to an embodiment of the disclosure.

The configuration of a computer network may be broken down into several rings. FIG. 2 is an illustration 50 of ordering different elements of one of the disclosed embodiments that may be used with one of the disclosed embodiments. In this embodiment, a functional elements ring 52, an interconnecting switches ring 54, and a core switches ring 56 are shown. It is understood that the determination of the operational requirements may be done starting at any point within the ring. For instance, if the requirements of the core switches ring 56 are known, the requirements of the interconnecting switches ring 54 may be determined, and the requirements of the functional elements ring 52 may be determined. It is therefore understood that one or more rings may be used to determine the requirements of the remaining rings irrespective of which is known.

Once the network requirements have been determined, the network hardware may be configured. For exemplary purposes, the discussion of the network hardware will take the form of discussing an ISL. This switch may be used as a core element, an interconnecting element, or both a core element and an interconnecting element. The ISL switch has at least two configurable options. The first is the number of cards used in the switch and the second is the number of ports on each card. The number of cards and the number of ports selectable based upon the needs of the data center 10.

Cards in an ISL switch are seated onto a connection board, expansion board, or motherboard. The cards may be seated using any connecting bus, including, but not limited to, the peripheral component interconnect (PCI) bus, the enhanced PCI (PCIe), or any other system or method that promotes the connection of the cards to the connection, expansion, or motherboard component.

Figure 3:
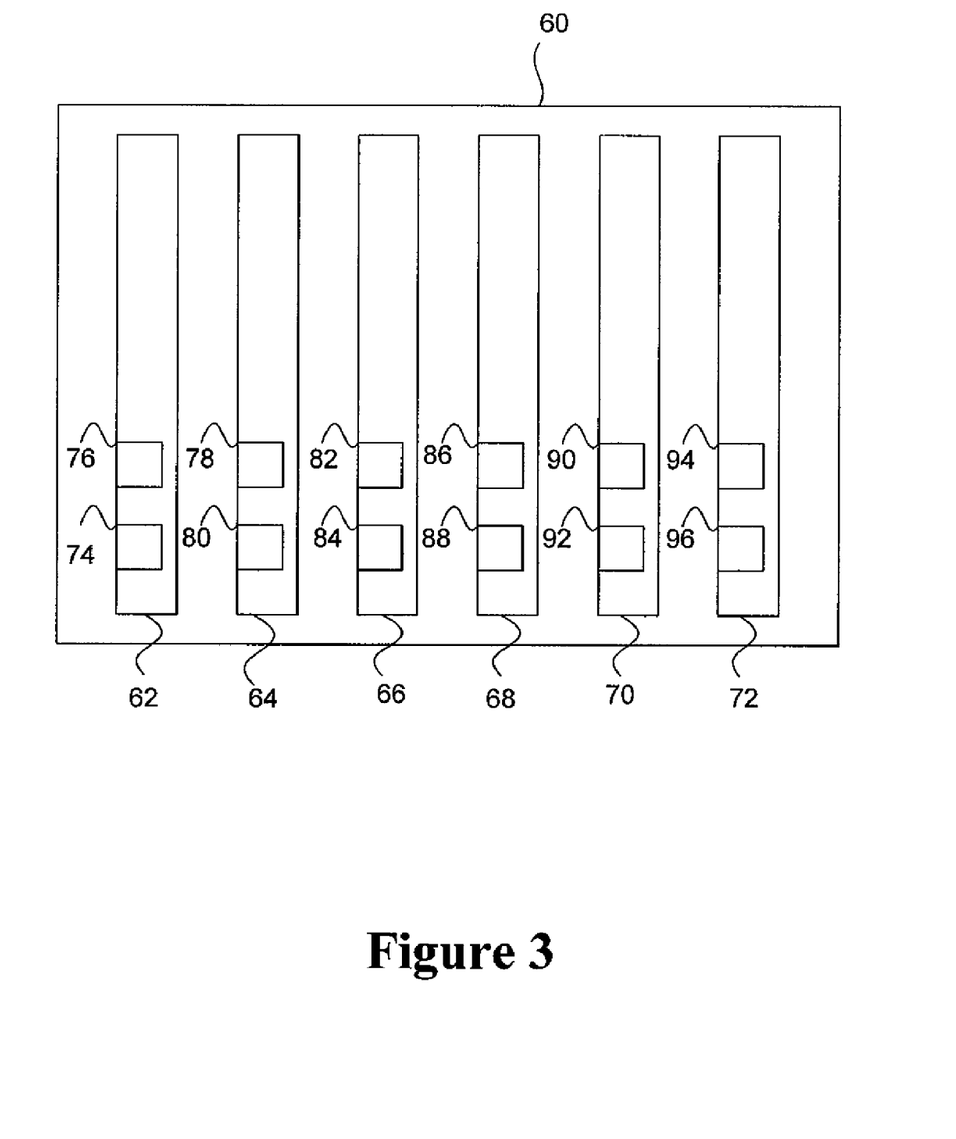
FIG. 3 is an illustration of an Inter-Switch Link according to an embodiment of the disclosure.

FIG. 3 is a diagram of a generic ISL switch 60. In this example, generic switch 60 has six separate switch cards. A first switch card 62 is shown with a port 74 and a port 76. A second switch card 64 is shown with a port 78 and a port 80. A third switch card 66 is shown with a port 82 and a port 84. A fourth switch card 68 is shown with a port 86 and a port 88. A fifth switch card 70 is shown with a port 90 and a port 92. A sixth switch card 66 is shown with a port 94 and a port 96. It is explicitly understood that each switch card 62-72 may have any number of ports, and the ports shown are for illustrative purposes. Moreover, each switch card 62-72 may be capable of supporting any bit rate. The configuration of the switch therefore may, in some embodiments contain both a number of ports, hereinafter referred to as "port (n)". Each port has a specific bandwidth that is allowed through the port, hereinafter referred to as "bandwidth (port(n))". The total bandwidth of the card therefore is the sum of the bandwidth (port(n)). While six switch cards 62-72 are illustrated in FIG. 3, it is explicitly understood that any number of switch cards may be configured consistent with the present.

The total capacity of the ISL switch 60 may be described as "Σ bandwidth (port(n))=total capacity". In an embodiment, in order for the data center 10 to operate properly, the required bandwidth of the data center 10 should be less than or equal to Σ bandwidth (port(n)). In addition, each port(n) must support a bandwidth that is larger or equal to the required bandwidth of the switch or functional element connecting to the port (n). Therefore, in order to design the ISL switch 60 both the individual port(n) bandwidth needs to be taken into consideration, but also the Σ bandwidth (port(n)) needs to be considered.

Each individual port(n) will be connected to at least one other individual port(n). In order to optimize connections, it may be desired that each individual port(n) be matched to another port(n) with the same or close to the same available bandwidth. Therefore, these ports may be matched by their requirements as closely as possible without violating the inequalities previously discussed. By matching the requirements as closely as possibly, bandwidth is not wasted.

The following example discusses one method of configuring the ISL switch 60 when used as the interconnecting element server switch 36. The configuration of the ISL switch 60 is a process requiring at least two discrete sets of data. The first set of data is the parameters of the physical hardware available. For this example embodiment, it can be assumed that physical switch cards have the configuration of either 4 Gbit/s with two ports on one card or 10 Gbit/s with one port on the card. In addition, the maximum requirement of the first server 12 may be for a 4 Gbit/s connection, the maximum requirement for the second server 14 may be for a 1 Gbit/s connection, and the maximum requirement for the third server 16 may be a 1 Gbit/s connection. In this example, the cards may be optimized using a configuration of one 4 Gbit/s card for the first server 12 and using a 1 Gbit/s card for both the second server 14 and the third server 16. In this way, the cards are optimized for the specific environment that is being used in the data network. After the requirements for each of the core switches 44, 46 is determined, additional cards will be added to permit the communication of the functional elements with the core switches 44, 46. The number of cards and the configuration of the cards, taking the previously discussed device oversubscription into account, will allow for communication between the functional elements and the core switches 44, 46. This communication further allows and promotes communication between different functional elements.

Figure 4:
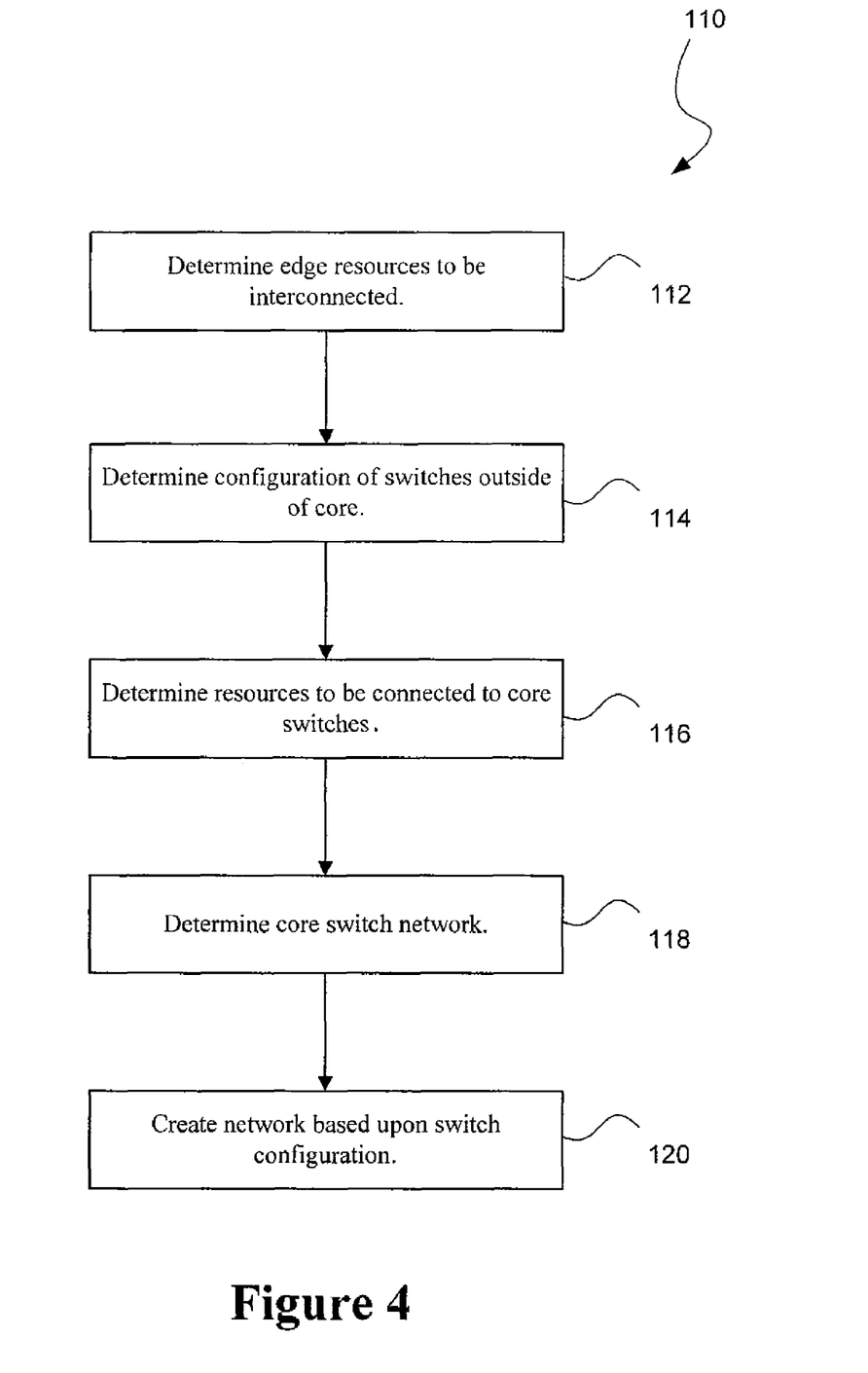
FIG. 4 is a flowchart of a method of designing a switch configuration according to an embodiment of the disclosure.

FIG. 4 is a flow chart of a method 110 of determining the switch configuration using the edge to core arrangement. In the method 110, the edge resources (e.g. functional elements) to be interconnected are determined in block 112. These edge resources may include the number of ports of the functional elements, the bandwidth of the ports of the functional elements, and the operational requirements of the functional elements. Also in the method 110, the configuration of the switches outside of the core is configured in block 114. The configuration of the switches outside of the core may include the ISL 60 configuration which may include the number and bandwidth of ports. In addition, the resources to be connected to core switches are also determined in block 116. Also, the configuration of the core switch network is determined in block 118. The configuration of the core switch network includes the number of ports required and the bandwidth of the ports required. Finally, the network configuration is determined based upon the core switch network, and the network configuration is created based upon the switch configuration in block 120. The network configuration may be created as a file placed on a computer readable medium, or output as a print out created by a physical printer.

Figure 5:
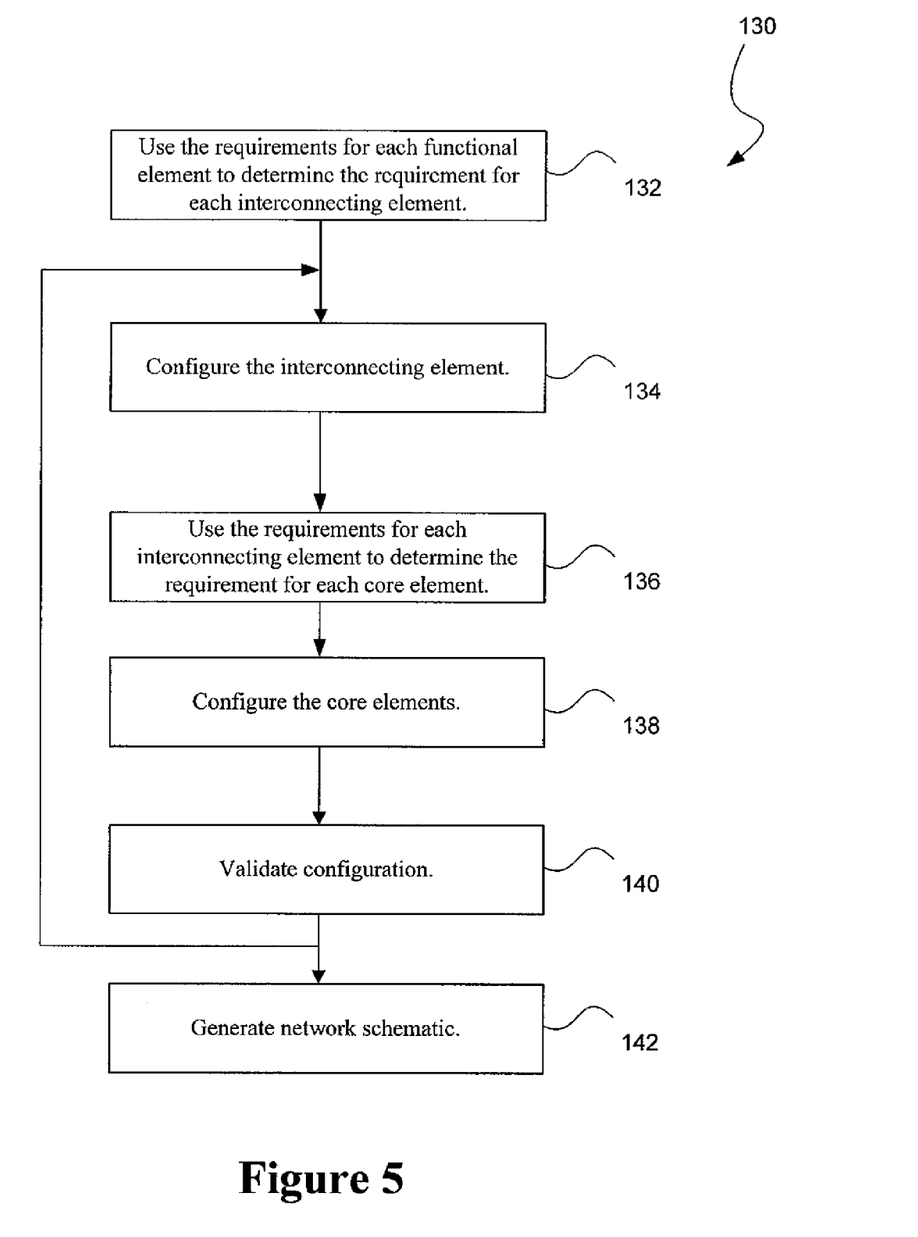
FIG. 5 is a flowchart of a method of designing a network configuration according to an embodiment of the disclosure.

FIG. 5 is a flowchart of a method 130 of automatically configuring the switches used in a data network. As used herein, configuring may refer to either the process of identifying or designing a configuration of switches in the network and/or the physical process of building out or assembling the switches according to the design. Practically speaking, once the design and/or configuration of the switches has been defined, the process of building out the switch to the design configuration is relatively trivial. In this example, the requirements of each functional element are used to determine the requirements for each interconnecting element in block 132. In addition, the configuration of the interconnecting switches is determined in block 134. This configuration may be done through querying a database to determine the physical configurations of cards available and then selecting cards which will best meet the needs of the functional elements. The requirements for each of the interconnecting elements may be used to determine the requirements for a plurality of core elements in block 136. The core elements may be configured in block 138. The configurations created in FIG. 5 may be validated (e.g., checked for errors, optimized by suggesting the movement of a functional element from one interconnecting switch to another interconnecting switch, etc.) in block 140. If a problem in the configuration is detected, steps in FIG. 5 will be repeated and a new configuration may be created. If no errors are detected, a network schematic may be automatically created in block 142, for example by an application executing on a computer. In an embodiment, the application may be provided, at least in part, by a spreadsheet application. In an embodiment, other portions of the method 130 may also be performed by the application.

Figure 6:
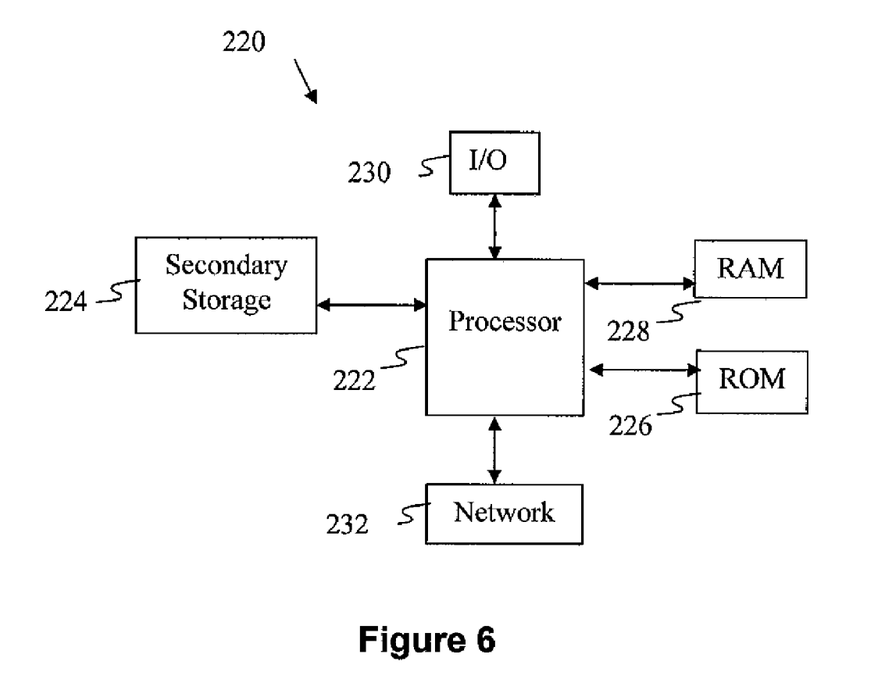
FIG. 6 is an illustration of a general purpose computer system according to an embodiment of the disclosure.

Portions of the system described above, for example the data center 10, may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 220 includes a processor 222 (which may be referred to as a central processor unit or CPU) that is in communication with memory devices including secondary storage 224, read only memory (ROM) 226, random access memory (RAM) 228, input/output (I/O) devices 230, and network connectivity devices 232. The processor may be implemented as one or more CPU chips.

The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution. The ROM 226 is used to store instructions and perhaps data which are read during program execution. ROM 226 is a non-volatile memory device which typically has a small memory capacity relative to the larger memory capacity of secondary storage. The RAM 228 is used to store volatile data and perhaps to store instructions. Access to both ROM 226 and RAM 228 is typically faster than to secondary storage 224.

I/O devices 230 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and or worldwide interoperability for microwave access (WiMAX) radio transceiver cards, and other well-known network devices. These network connectivity devices 232 may enable the processor 222 to communicate with an Internet or one or more intranets. With such a network connection, it is contemplated that the processor 222 might receive information from the network, or might output information to the network in the course of performing the above-described method steps. Such information, which is often represented as a sequence of instructions to be executed using processor 222, may be received from and outputted to the network, for example, in the form of a computer data signal embodied in a carrier wave.

Such information, which may include data or instructions to be executed using processor 222 for example, may be received from and outputted to the network, for example, in the form of a computer data baseband signal or signal embodied in a carrier wave. The baseband signal or signal embodied in the carrier wave generated by the network connectivity devices 232 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 222 executes instructions, codes, computer programs, scripts which it accesses from hard disk, floppy disk, optical disk (these various disk based systems may all be considered secondary storage 224), ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of configuring a network, the method comprising:
 creating, by a processor, a list containing a plurality of functional elements for the network, a number of functional element ports for each functional element, and a bandwidth of each functional element port;
 selecting, by the processor, an acceptable oversubscription rate of the plurality of functional elements;
 identifying, by the processor, a number of interconnecting element ports and an interconnecting element bandwidth associated with each of the interconnecting element ports based on the plurality of functional elements, operational requirements of the functional elements, the number of functional element ports for each functional element, the bandwidth of each functional element port, and the acceptable oversubscription rate;

designing, by the processor, a plurality of interconnecting elements required to connect the functional elements, wherein the plurality of interconnecting elements accommodate the number of interconnecting element ports and the interconnecting element bandwidth associated with each of the interconnecting element ports;

identifying, by the processor, a number of core elements ports and a core element bandwidth associated with each of the core element ports based on the plurality of functional elements, the operational requirements of the plurality of functional elements, the number of interconnecting element ports, the bandwidth of each interconnecting element port, and the acceptable oversubscription rate;

designing, by the processor, a plurality of core elements to accommodate the number of core element ports and the core element bandwidth associated with each core elemental ports;

determining, by the processor, a network configuration for connecting each of the plurality of functional elements to one or more of the plurality of interconnecting elements and connecting each of the plurality of core elements to one or more of the interconnecting elements; and creating, by the processor, a schematic of a configuration of the network.

2. The method of claim 1, wherein the core elements are inter-switch link (ISL) switches.

3. The method of claim 1, wherein the functional elements are selected from a group comprising servers, other storage units, legacy storage units, and disk storage units.

4. The method of claim 1, wherein the operational requirements comprise latency requirements and bandwidth requirements.

5. The method of claim 1, wherein the acceptable oversubscription rate comprises the product of the device oversubscription multiplied with the network oversubscription.

6. The method of claim 1, wherein the list further includes the corresponding operational requirement of each of the functional element ports.

7. The method of claim 1, wherein designing a plurality of interconnecting elements comprises:

querying a database to determine a physical configuration of one or more cards available, wherein the one or more cards each comprise one or more ports, and wherein each of the one or more ports of the one or more cards each have an associated bandwidth; and selecting the one or more cards that accommodate the number of interconnecting element ports and the interconnecting element bandwidth associated with each of the interconnecting element ports.

8. An automated method for configuring a network, the automated method comprising:

determining, by a processor, a latency requirement, a bandwidth requirement, and a throughput requirement for each of a plurality of interconnecting elements;

determining, by the processor, a latency requirement, a bandwidth requirement, and a throughput requirement for each of a plurality of core elements used to connect the plurality of interconnecting elements using the latency requirement, the bandwidth requirement, and the throughput requirement for each of the plurality of interconnecting elements;

designing, by the processor, the plurality of core elements based on the latency requirement, the bandwidth requirement, and the throughput requirement for each of the plurality of core elements;

determining, by the processor, a latency requirement, a bandwidth requirement, and a throughput requirement for each of a plurality of functional elements to be connected to the interconnecting elements using one or more of the latency requirement, the bandwidth requirement, and the throughput requirement for each of the plurality of interconnecting elements and the latency requirement, the bandwidth requirement, and the throughput requirement for each of for the plurality of core elements; and creating, by an application stored on a non-transitory media and executed by the processor, a network configuration for the plurality of functional elements, the plurality of core elements, and the plurality of interconnecting elements.

9. The method of claim 8, further comprising validating the configuration.

10. The method of claim 8, further comprising optimizing the configuration.

11. The method of claim 10, wherein the optimization of the configuration comprises moving a functional element that is connected to a switch to be connected to a second switch.

12. The method of claim 8, wherein the network configuration includes a port configuration for each of the plurality of interconnecting elements.

13. A system for configuring a network, the system comprising a memory component to store instructions and network information related to a data network, wherein the data network comprises at least one core switch, at least one interconnecting switch, and at least one functional element, and wherein the network information includes a number of ports for each of the at least one core switch, the at least one interconnecting switch, and the at least one functional element, and a bandwidth associated with each of the ports;

an interface to accept input, wherein the input includes an acceptable oversubscription rate;

a processor component that executes the instructions stored in the memory component to:

identify a number of core elements ports and a core element bandwidth associated with each of the core element ports based on the plurality of functional elements, the operational requirements of the plurality of functional elements, the number of interconnecting element ports, the bandwidth of each interconnecting element port, and the acceptable oversubscription rate;

determine the capabilities of each port on each of at least one core switch, the at least one interconnecting switch, and the at least one functional element, and use the capabilities of each port to create a network schematic that reconfigures the physical connections between the ports of the at least one core switch, the at least one interconnecting switch, and the at least one functional element by indicating the physical connections between ports of substantially equal bandwidth, and an output component to output the network schematic.

14. The system of claim 13, wherein the output component creates an output to a computer readable medium.

15. The system of claim 13, wherein the interface is a graphical user interface.

16. The system of claim 13, wherein the memory component comprises a hard drive and random access memory.

17. The system of claim 13, wherein the processor further executes the instructions to create redundancy within the network.

18. The system of claim 13, wherein the processor further executes the instructions to validate the network configuration.

19. The system of claim 13, wherein the memory component further comprises network information related to the operational requirements of the at least one functional element.

* * * * *